US008713881B2

(12) United States Patent
DuPont et al.

(10) Patent No.: US 8,713,881 B2
(45) Date of Patent: May 6, 2014

(54) SOLAR PANEL SECURING SYSTEM

(75) Inventors: Luc DuPont, Berkeley, CA (US); Brian C. Cheung, San Francisco, CA (US)

(73) Assignee: A. Raymond et Cie, Grenoble (FR)

( * ) Notice: Subject to any disclaimer, the term of this patent is extended or adjusted under 35 U.S.C. 154(b) by 189 days.

(21) Appl. No.: 13/359,944

(22) Filed: Jan. 27, 2012

(65) Prior Publication Data
US 2013/0192150 A1 Aug. 1, 2013

(51) Int. Cl.
*E04B 2/30* (2006.01)
(52) U.S. Cl.
USPC .......... 52/489.2; 52/173.3; 52/489.1; 52/768; 52/775
(58) Field of Classification Search
USPC .......... 52/173.3, 489.1, 489.2, 766, 768, 769, 52/772, 774, 775, 745.11, 478, 520, 522, 52/543, 544, 549, 551; 248/222.41, 248/223.21, 225.11; 403/348, 349; 41/349, 41/549, 553; 24/663; 126/623; 136/244
See application file for complete search history.

(56) References Cited

U.S. PATENT DOCUMENTS

| | | | |
|---|---|---|---|
| 3,757,268 A | 9/1973 | Genovese et al. | |
| 3,998,018 A | 12/1976 | Hodges | |
| 4,042,201 A * | 8/1977 | O'Callaghan | 248/309.1 |
| 4,094,485 A * | 6/1978 | O'Callaghan | 248/222.11 |
| 4,106,251 A | 8/1978 | Nelsson | |
| 4,113,982 A | 9/1978 | Glaesel | |
| 4,189,881 A | 2/1980 | Hawley | |
| 4,195,895 A | 4/1980 | Ziegler | |
| 4,215,677 A | 8/1980 | Erickson | |
| 4,225,265 A * | 9/1980 | Hooker et al. | 403/353 |
| 4,256,359 A | 3/1981 | Storck | |
| 4,406,505 A | 9/1983 | Avramovich | |
| 4,833,848 A | 5/1989 | Guerin et al. | |
| 4,875,876 A | 10/1989 | O'Loughlin | |
| 5,092,939 A | 3/1992 | Nath et al. | |
| 5,232,518 A | 8/1993 | Nath et al. | |
| 5,409,549 A | 4/1995 | Mori | |
| 5,419,606 A | 5/1995 | Hull et al. | |
| 5,571,338 A | 11/1996 | Kadonome et al. | |

(Continued)

FOREIGN PATENT DOCUMENTS

DE 9409453 U1 8/1994
DE 102010022556 B3 6/2011

(Continued)

OTHER PUBLICATIONS

A Raymond drawing entitled "Solar clip Specific part"; Part No. 214803-1-00, for non-grounding clip shown in Solardis brochure; 1 page (believed to have been offered for sale in U.S. or published on or before Jul. 7, 2010).

(Continued)

*Primary Examiner* — Robert Canfield
*Assistant Examiner* — Matthew Gitlin
(74) *Attorney, Agent, or Firm* — Harness, Dickey & Pierce, P.L.C.

(57) ABSTRACT

A solar panel securing system is provided. In another aspect, a solar or photovoltaic panel assembly is mounted to a building roof in a screw-free manner. Another aspect employs a snap-in connection between a member pre-assembled to a solar panel and a roof-mounted bracket. A further aspect adhesively bonds a bracket directly to a glass surface of a solar panel. A method of securing a solar panel is additionally provided.

24 Claims, 5 Drawing Sheets

(56) References Cited

U.S. PATENT DOCUMENTS

| | | |
|---|---|---|
| 5,715,640 A | 2/1998 | Haddock |
| 5,762,720 A | 6/1998 | Hanoka et al. |
| 5,823,495 A * | 10/1998 | Joss et al. .................. 248/309.1 |
| 6,003,724 A * | 12/1999 | Collins et al. ................. 221/154 |
| 6,105,317 A | 8/2000 | Tomiuchi et al. |
| 6,111,189 A | 8/2000 | Garvison et al. |
| 6,123,314 A * | 9/2000 | Steele ........................... 248/681 |
| 6,186,698 B1 | 2/2001 | Knapp |
| 6,269,596 B1 | 8/2001 | Ohtsuka et al. |
| 6,370,828 B1 * | 4/2002 | Genschorek .................... 52/200 |
| 6,405,494 B1 | 6/2002 | Wismeth |
| 6,414,237 B1 | 7/2002 | Boer |
| 6,495,750 B1 | 12/2002 | Dinwoodie |
| 6,501,013 B1 | 12/2002 | Dinwoodie |
| 6,534,703 B2 | 3/2003 | Dinwoodie |
| 6,570,084 B2 | 5/2003 | Dinwoodie |
| 6,616,106 B1 * | 9/2003 | Dean et al. .................... 248/27.1 |
| 6,672,018 B2 | 1/2004 | Shingleton |
| 6,784,360 B2 | 8/2004 | Nakajima et al. |
| 6,809,253 B2 | 10/2004 | Dinwoodie |
| 6,959,517 B2 * | 11/2005 | Poddany et al. ............. 52/173.3 |
| 7,195,513 B1 | 3/2007 | Gherardini et al. |
| 7,217,058 B2 | 5/2007 | Herb |
| 7,260,918 B2 | 8/2007 | Liebendorfer |
| 7,297,866 B2 | 11/2007 | Aschenbrenner |
| 7,386,922 B1 | 6/2008 | Taylor et al. |
| 7,435,134 B2 | 10/2008 | Lenox |
| 7,592,537 B1 | 9/2009 | West |
| 7,600,349 B2 | 10/2009 | Liebendorfer |
| 7,621,487 B2 | 11/2009 | Brown et al. |
| 7,634,875 B2 | 12/2009 | Genschorek |
| 7,745,722 B2 | 6/2010 | Warfield et al. |
| 7,748,175 B2 | 7/2010 | Liebendorfer |
| 7,758,011 B2 | 7/2010 | Haddock |
| 7,766,292 B2 * | 8/2010 | Liebendorfer ................ 248/237 |
| 7,780,472 B2 | 8/2010 | Lenox |
| 7,797,883 B2 | 9/2010 | Tarbell et al. |
| 7,866,099 B2 | 1/2011 | Komamine et al. |
| 7,915,519 B2 * | 3/2011 | Kobayashi .................... 136/251 |
| 7,921,607 B2 | 4/2011 | Thompson et al. |
| 7,971,398 B2 | 7/2011 | Tweedie |
| 7,987,641 B2 | 8/2011 | Cinnamon |
| 8,025,508 B2 | 9/2011 | Parker et al. |
| 8,109,048 B2 | 2/2012 | West et al. |
| 8,156,697 B2 | 4/2012 | Miros et al. |
| 8,191,320 B2 | 6/2012 | Mittan et al. |
| 8,245,460 B2 * | 8/2012 | Yamanaka et al. ........... 52/173.3 |
| 8,266,848 B2 | 9/2012 | Miros et al. |
| 8,387,319 B1 * | 3/2013 | Gilles-Gagnon et al. .... 52/173.3 |
| 8,397,448 B2 | 3/2013 | Brown et al. |
| 8,413,944 B2 * | 4/2013 | Harberts et al. ............. 248/500 |
| 8,590,223 B2 | 11/2013 | Kilgore et al. |
| 2003/0101662 A1 | 6/2003 | Ullman |
| 2003/0177706 A1 | 9/2003 | Ullman |
| 2006/0156648 A1 | 7/2006 | Thompson et al. |
| 2008/0035140 A1 | 2/2008 | Placer et al. |
| 2008/0053517 A1 | 3/2008 | Plaisted et al. |
| 2008/0245404 A1 | 10/2008 | DeLiddo |
| 2008/0257402 A1 | 10/2008 | Kamp et al. |
| 2009/0019795 A1 * | 1/2009 | Szacsvay et al. ............ 52/173.3 |
| 2009/0019796 A1 * | 1/2009 | Liebendorfer ............... 52/173.3 |
| 2009/0025314 A1 | 1/2009 | Komamine et al. |
| 2009/0114269 A1 * | 5/2009 | Fletcher et al. ............... 136/251 |
| 2009/0242014 A1 | 10/2009 | Leary |
| 2010/0154784 A1 * | 6/2010 | King et al. .................... 126/623 |
| 2010/0180933 A1 | 7/2010 | Aftanas et al. |
| 2010/0192505 A1 | 8/2010 | Schaefer et al. |
| 2010/0236162 A1 | 9/2010 | Tweedie |
| 2010/0236542 A1 | 9/2010 | Pierson et al. |
| 2010/0243023 A1 * | 9/2010 | Patton et al. .................. 136/244 |
| 2010/0263297 A1 | 10/2010 | Liebendorfer |
| 2010/0276558 A1 | 11/2010 | Faust et al. |
| 2010/0282290 A1 * | 11/2010 | Schwarze et al. ............. 136/244 |
| 2011/0036028 A1 | 2/2011 | Beck |
| 2011/0039430 A1 | 2/2011 | Aftanas |
| 2011/0073155 A1 * | 3/2011 | Sillmann et al. .............. 136/244 |
| 2011/0088740 A1 | 4/2011 | Mittan et al. |
| 2011/0100433 A1 | 5/2011 | Jonczyk |
| 2011/0126881 A1 * | 6/2011 | Hong et al. ................... 136/244 |
| 2011/0138585 A1 | 6/2011 | Kmita et al. |
| 2011/0147553 A1 | 6/2011 | Ostermeier et al. |
| 2011/0179606 A1 | 7/2011 | Magno, Jr. et al. |
| 2011/0203637 A1 * | 8/2011 | Patton et al. .................. 136/244 |
| 2011/0214366 A1 | 9/2011 | Haddock et al. |
| 2011/0232212 A1 | 9/2011 | Pierson et al. |
| 2011/0284058 A1 | 11/2011 | Cinnamon |
| 2012/0198779 A1 * | 8/2012 | Tachino ....................... 52/173.3 |
| 2012/0199181 A1 * | 8/2012 | Newman et al. .............. 136/251 |
| 2012/0298817 A1 * | 11/2012 | West et al. ................ 248/220.22 |
| 2013/0091786 A1 * | 4/2013 | DuPont et al. ............... 52/173.3 |
| 2013/0102165 A1 * | 4/2013 | DuPont ........................... 439/95 |

FOREIGN PATENT DOCUMENTS

| | | |
|---|---|---|
| EP | 0671581 A2 | 9/1995 |
| FR | 2163787 A5 | 7/1973 |
| FR | 2209024 A1 | 6/1974 |
| GB | 423385 A | 1/1935 |
| GB | 1218275 A | 1/1971 |
| GB | 1510258 A | 5/1978 |
| JP | 60050348 A | 3/1985 |
| JP | 7243428 A | 9/1995 |
| JP | 10266499 A | 10/1998 |
| JP | 10339008 A | 12/1998 |
| KR | 102011011641 | 10/2011 |
| NL | 8304155 A | 7/1985 |
| WO | WO-8301476 A1 | 4/1983 |
| WO | WO-9816699 A1 | 4/1998 |
| WO | WO-2010149278 A1 | 12/2010 |
| WO | WO-2012/014203 A2 | 2/2012 |

OTHER PUBLICATIONS altEstore; Internet Advertisement Publication; "Groundings Lugs With Set Screw"; www.altestore.com; Aug. 25, 2011.

Conergy Heavy Snow Roof Hook—20 Units; Internet publication; www.ecodirect.com; Oct. 4, 2011; 2 pages.

Conergy Sun Top CMS-10057 Double Roman Tile Roof Hook—20 pack; Internet publication; www.ecodirect.com; Oct. 4, 2011; 2 pages.

Conergy Sun Top CMS-10059 Flat Tile Roof Hook—20 pack; Internet publication; www.ecodirect.com; Oct. 4, 2011; 2 pages.

Rayvolt; Internet Advertisement Publication; "Panel fasteners"; Raygroup; May 2011.

Solar Stainless Steel Roof Hook; Internet publication; www.alibaba.com; Oct. 4, 2011; 2 pages.

Solardis; Brochure; "soprasolar fix"; www.soprasolar.com; Jul. 7, 2010; pp. 1-10.

Stainless Steel Hook Solar Panel Roofing Hook; Internet publication; www.alibaba.com; Oct. 4, 2011; 1 page.

Stainless Steel Hook Solar Panel Roofing Hook; Internet publication; www.alibaba.com; Oct. 4, 2011; 2 pages.

Stainless Steel Hook Solar Panel Roofing Hook; Internet publication; www.alibaba.com; Oct. 4, 2011; 3 pages.

Stainless Steel Tin Roof Hook SS Tin Hook; Internet publication; www.alibaba.com; Oct. 4, 2011; 2 pages.

\* cited by examiner

SOLAR PANEL SECURING SYSTEM

BACKGROUND AND SUMMARY

The present application relates generally to an attachment system and more particularly to a solar panel securing system for a building.

Conventional photovoltaic or solar panels are mounted to roofs of buildings through screw-in clips or the like. Examples of such conventional devices are disclosed in U.S. Patent Publication No. 2011/0088740 entitled "Photovoltaic Panel Clamp" which published to Mittan et al. on Apr. 21, 2011, and U.S. Pat. No. 6,672,018 entitled "Solar Module Mounting Method and Clip" which issued to Shingleton on Jan. 6, 2004, both of which are incorporated by reference herein. Such conventional methods cause the installer to juggle many loose fasteners while simultaneously holding heavy solar panels and/or roof mounting components, often on a tilted metal roof in unpleasant weather conditions. Furthermore, such traditional multi-piece screw or bolt arrangements take considerable time to install while also having inconsistent installation torque values, especially in the common situation where many of these solar panel mounting devices are required for each roof.

Other traditional constructions use heavy metal roof hooks that are mounted by driving screws through the roof into underlying studs. A raised arm of these roof hooks is screwed or bolted to an elongated roof rail or to a frame surrounding a peripheral edge of a solar panel. This leads to roof leaks and is clumsy to install. Additionally, peripheral frames add undesireable cost and weight to the solar panel assembly, and make them more difficult to raise onto a building roof.

In accordance with the present invention, a solar panel securing system is provided. In another aspect, a solar photovoltaic panel assembly is mounted to a building roof in a screw-free manner. Another aspect employs a snap-in connection between a member pre-assembled to a solar panel and a roof-mounted fastening bracket. A further aspect adhesively bonds a bracket directly to a glass surface of a solar panel so that the expense and weight of a peripheral solar panel frame are avoided. Pivoting of one side of a solar panel relative to a roof rail is also employed to assist in ease of installation. A method of securing a solar panel is additionally provided.

The present solar panel securing system is advantageous over traditional devices. For example, in one aspect, a simplified installation motion is employed to engage an auxiliary component, such as a photovoltaic panel assembly, with a mounting hook and/or snap-in tab. In an aspect of the present system, a solar panel is quickly and easily secured to a building roof in a fast manner without requiring the installer to juggle multiple parts such as screws. In another aspect, a fastening bracket is very inexpensive to manufacture. Furthermore, a section of the present system is pre-assembled upon a building roof via an easy to install roof clamp and rail, and another mating section is pre-assembled to the solar panel, prior to assembly of the solar panel assembly to the fastening system. An aspect of the fastening bracket of the present securing system ideally allows for tolerance variations and part expansion. Moreover, an aspect allows for use of a frameless glass solar panel thereby reducing part cost and weight. Additional advantageous and features of the present invention will become apparent in the following description and appended claims, taking in conjunction with the accompanying drawings.

DETAILED DESCRIPTION

Figure 1:
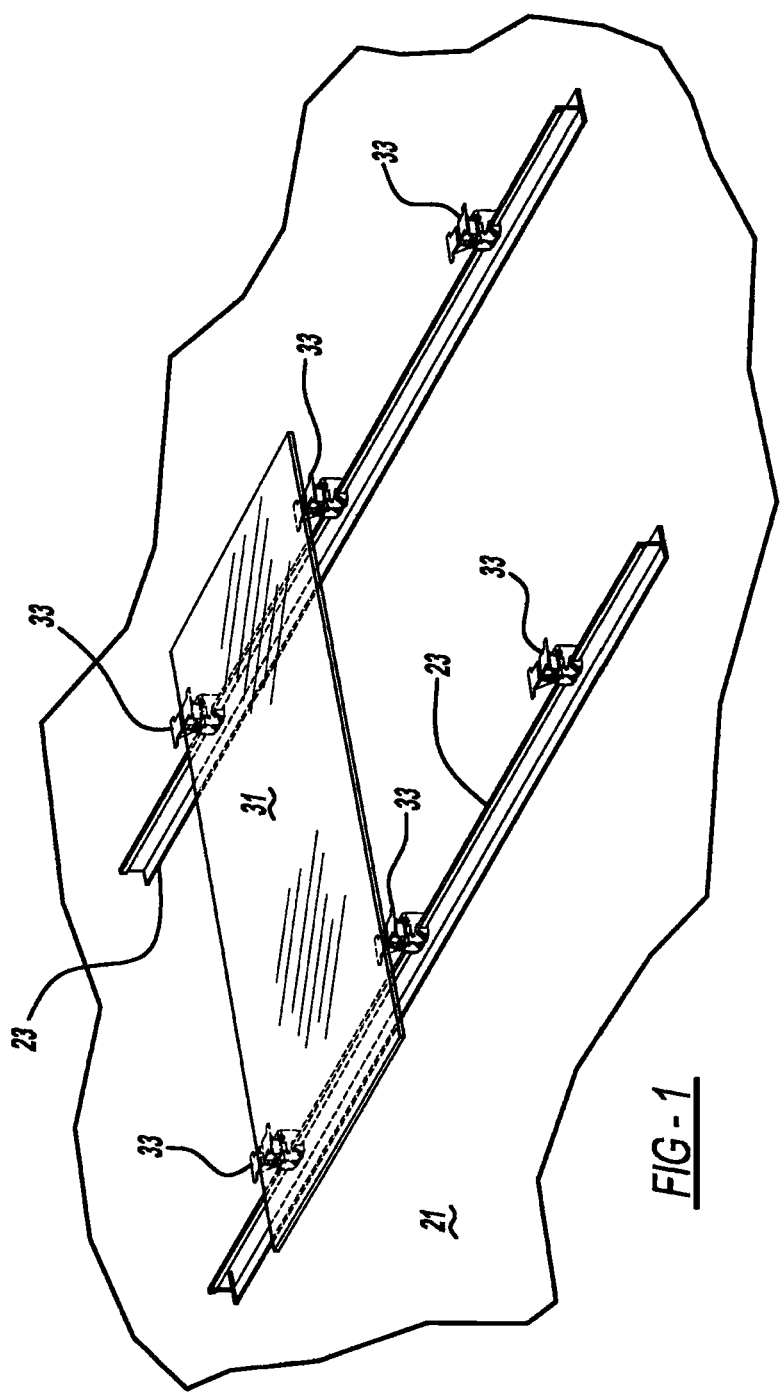
FIG. 1 is a top perspective view showing a preferred embodiment system securing a solar panel to rails located on a building roof.
Figure 2:
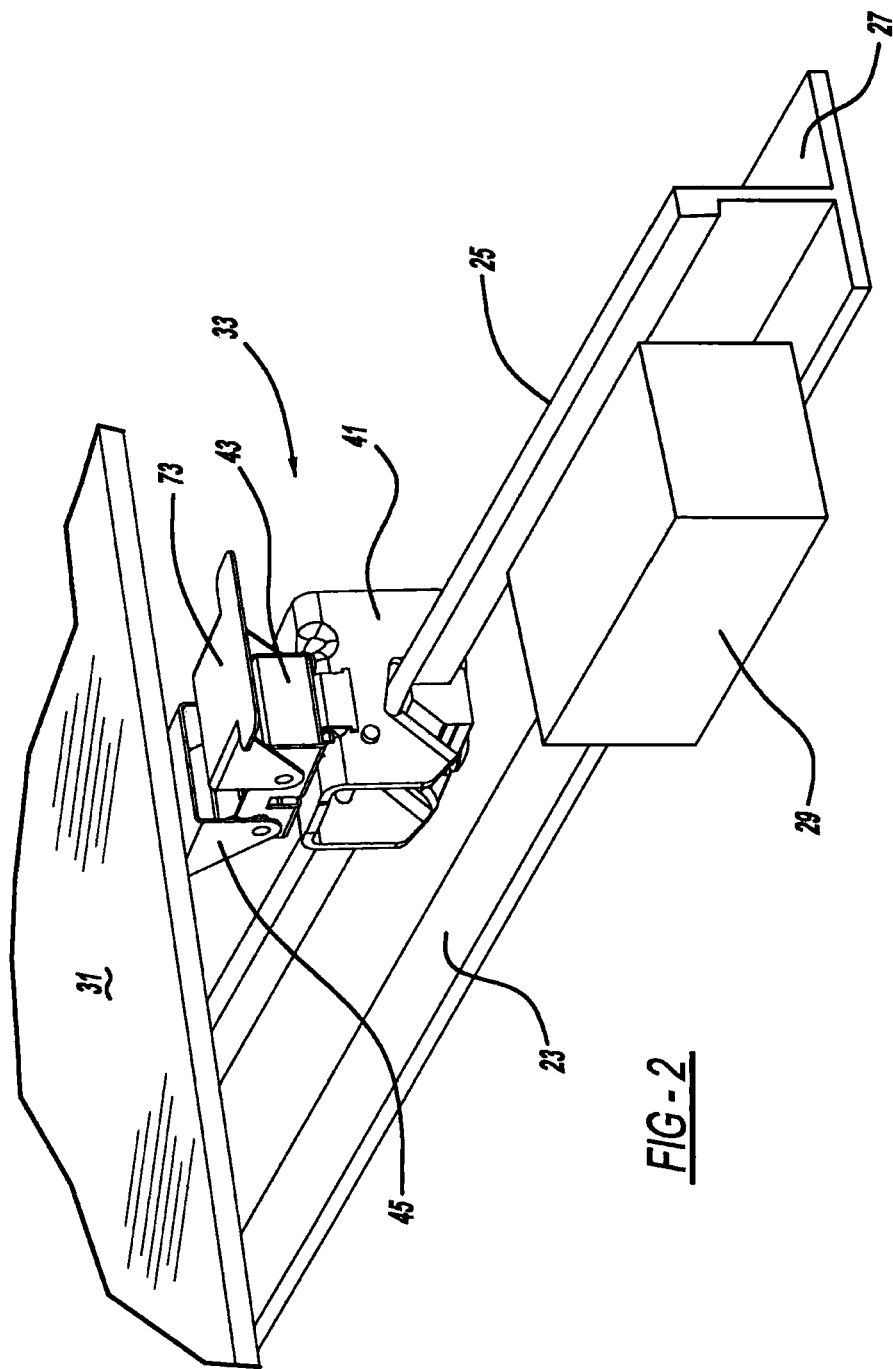
FIG. 2 is a top perspective view showing the preferred embodiment system mounted to the rail.
Figure 3:
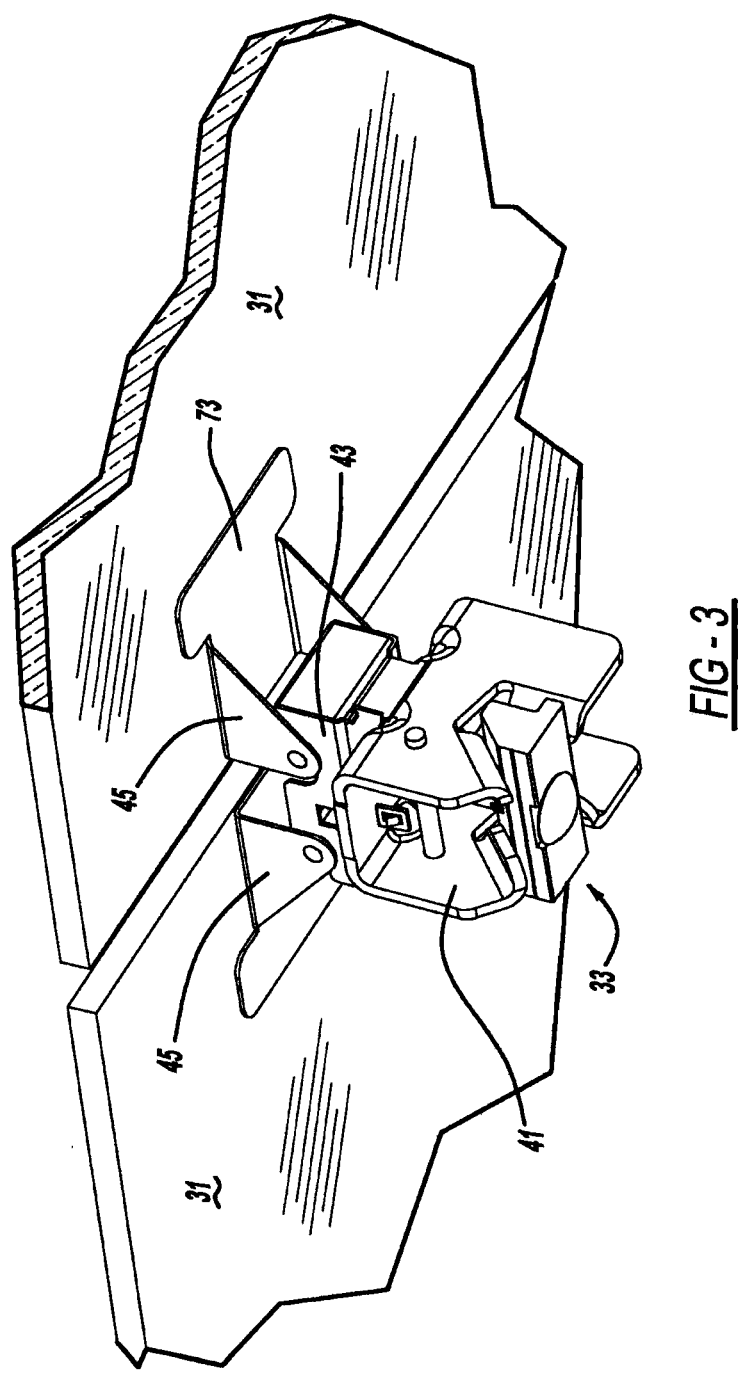
FIG. 3 is a bottom perspective view showing the preferred embodiment system securing a pair of the solar panels to the rail.

FIGS. 1-3 illustrate a building having a flat roof 21 upon which is located a pair of parallel rails 23. Each rail 23 has a generally inverted T-shape including an upstanding flange 25 and a flat base 27. Ballast, such as bricks 29, rest upon base 27 to hold each rail 23 upon roof 21 without piercing the roof by screws or the like. Rails 23 are preferably pultruded and resinated, long strand fiberglass which advantageously does not require electrical grounding, avoids corrosion and is light weight. Alternately, the rails can be aluminum, steel or other materials although various advantages will not be realized. Auxiliary roof components, preferably multiple photovoltaic or solar panels 31, are secured to flanges 25 by way of multiple securing systems 33. Each solar panel 31 includes metal and glass sheets with silicon wafers, preferably without peripherally surrounding mounting frames.

Figure 4:
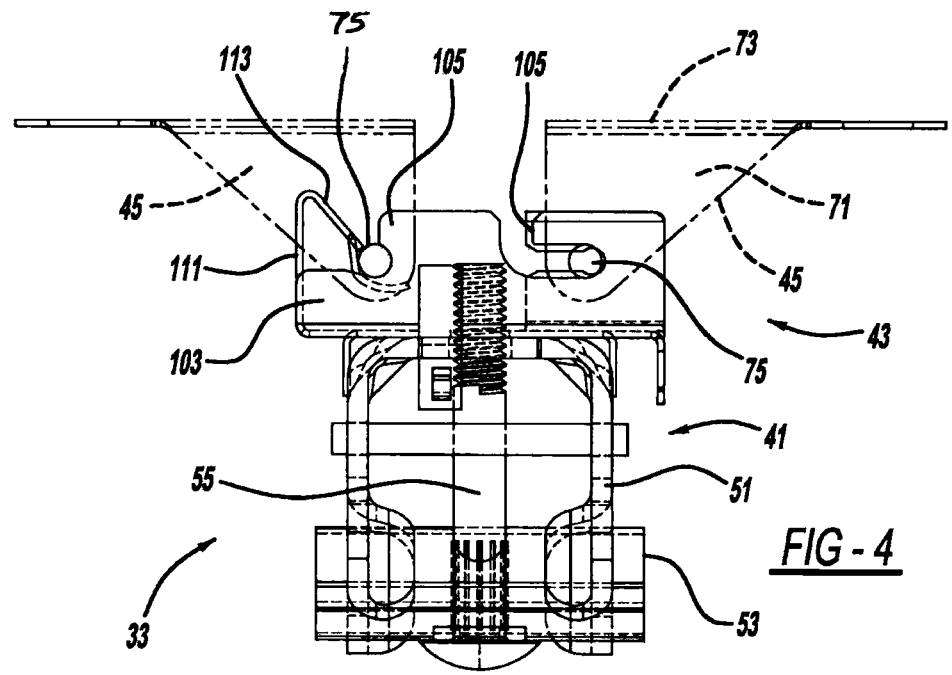
FIG. 4 is a side elevational view showing the preferred embodiment system securing the solar panels.
Figure 5:
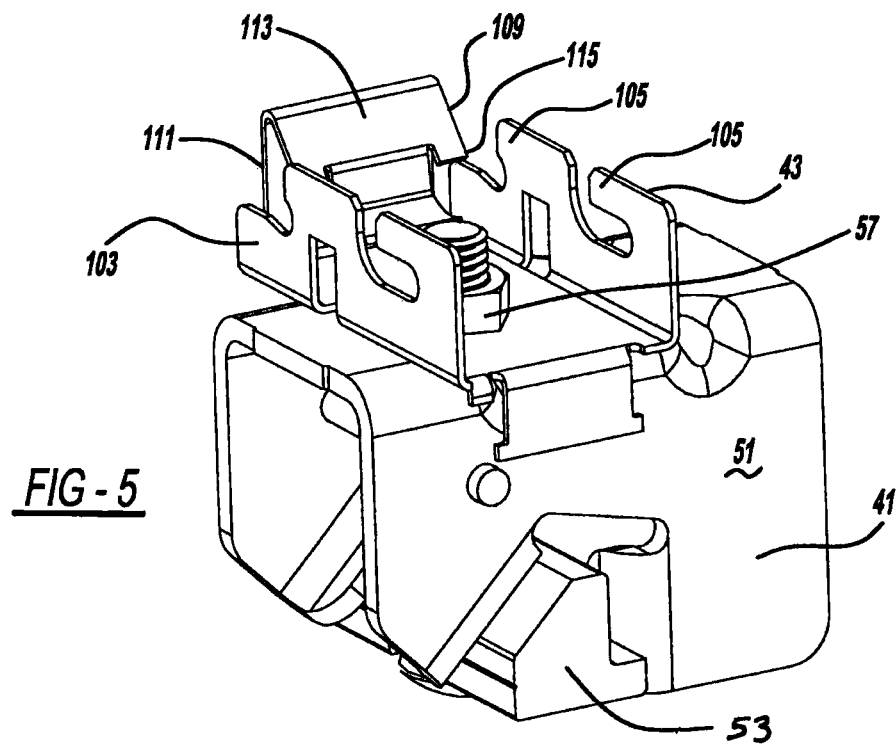
FIG. 5 is a top perspective view showing a fastening bracket and roof clamp of the preferred embodiment system.

Referring to FIGS. 3, 4 and 5, each securing system 33 includes a roof clamp 41, a catch or fastening bracket 43, and hinge brackets 45. Each roof clamp 41 is attached to flange 25 of rail 23. Each roof clamp 41 includes a saddle 51, a flange engaging wedge 53, and an elongated shaft or securing member 55. A generally C-shaped leaf spring (not shown) has pins at one end attached to holes in saddle 51, and is trapped between a head of shaft 55 and wedge 53 at the other end. The spring serves to retain wedge 53 to saddle 51 in a pre-assembled state prior to flange installation while also biasing wedge 53 into a clamping position toward a top wall of saddle 51 and flange 25. Thus, camming action of flange-engaging wedge 53 along diagonal internal surfaces of saddle 51 compresses roof clamp 41 to flange 25 of rail 23. Tightening of a nut 57 onto shaft 55 secures wedge 53, and thus roof clamp 41, to the flange. When an installer manually pushes a proximal exposed end of shaft 55 (opposite its head) toward saddle 51, against the biasing force of the spring and through an oversized hole in the top wall of the saddle, wedge 53 is pushed to an open position allowing flange access into an opening of saddle 51. Notably the same shaft 55 that secures roof clamp 41 to rail 23 also secures an auxiliary-retaining device, such as fastening bracket or catch 43, along a top surface of saddle 51.

Saddle 51, wedge 53, shaft 55, the spring and optionally fastening bracket 43 are pre-assembled prior to placing roof clamp 41 in the proximity of rail flange 25. "Pre-assembled" for the clamp refers to the components being attached as a single unit such that shaft 55, and optionally a very loose engagement of nut 57 (so as to provide lost motion movement of the spring and wedge relative to the saddle), keep them attached together. This can be achieved either on the ground near the work site, at a remote site, or at the factory in which roof clamp 41 is manufactured. When wedge 53 is retracted to trap flange 25 between an inner foot of the wedge and the inner opening edge of saddle 51, a portion of shaft 55 extends beyond the top surface of saddle 51 such that the proximal threaded end of shaft 55 also provides an attachment point for fastening bracket 43 and nut 57. The roof clamp preferably attaches to the rail flange due to lateral compression of the wedge but without flange piercing or side-mounted threaded screws. Alternately, the rails and flanges can be replaced by a turned standing seam where metal roof section are joined together.

Each hinge bracket 45 has a pair of generally triangularly shaped side plates 71 joined by a top plate 73 spanning therebetween. A pivot pin 75 also bridges between lower corners of side plates 71. A Raybond™ brand polyurethane adhesive is used to directly attach top plate 73 to a bottom surface of the solar panel glass. The assembly is preferably done off-site before the solar panel is raised onto the building roof. Hinge brackets 45 can be made from stamped metal or an injection molded polymer.

Figure 6:
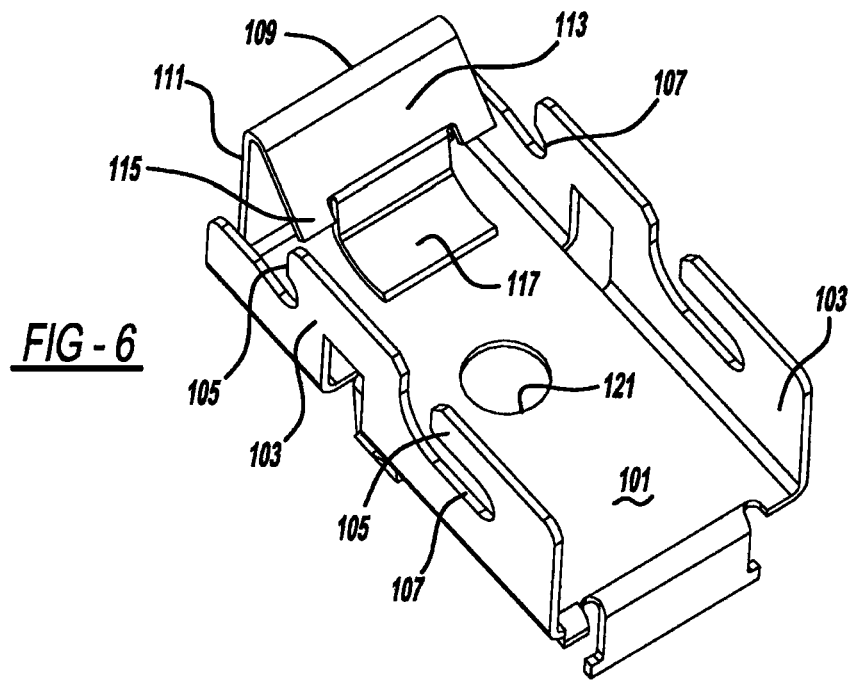
FIG. 6 is a top perspective view showing the fastening bracket of the preferred embodiment system.

Referring now to FIGS. 4-6, fastening bracket 43 is preferably stamped metal and includes a generally flat and rectangular base wall 101, upwardly bent side walls 103 and at least two, and more preferably four, hooks 105 disposed upon side walls 103. Each hook 105 has an undercut access slot or receptacle 107 and a leading tip. A locking tab 109 is upwardly and inwardly turned from an edge of base 101. Tab 109 includes a generally vertical segment 111, an acutely angled diagonal segment 113, a pair of longitudinally severed and shorter finger segments 115, and an undulating and offset central tongue segment 117 (optionally with a raised bead 119) adjacent a distal end thereof. Slots 107 are all openly accessible generally facing toward tab 109 although the farthest slots are also upwardly facing. Furthermore, a slotted or oversized aperture 121 is centrally provided in bottom wall 101 to receive the threaded end of shaft 55 for nut attachment thereto. Fastening bracket 43 has a generally U-shape when viewed from its end, such as in FIG. 6.

Fastening bracket 43 and hinging brackets 45 advantageously provide a pivoting fastening motion for the solar panel 31 shown to the right of FIG. 4, and a linear snap-in motion to attach the solar panel 31 shown to the left of FIG. 4. Initially, during installation, a pair of hinging brackets 45 on one side of the left-shown solar panel 31 have their pivot pins 75 inserted into slots 107 located farthest from locking tabs 109 of the associated fastening brackets on a first of the roof rails. Thereafter, on the opposite right side of the left-shown solar panel 31, pins 75 of the left-shown hinge brackets 45 are pushed down diagonal segments 113 of locking tabs 109 until they deflect tongue segments 47 and are trapped between a crotch of each closest slot 107 and ends of finger segments 45. This provides a single motion, snap-in and locking function. Each locked pin 75 can be removed if the installer retracts tab 109 while pull up pin 75. The right-shown solar panel 31 has hinge brackets and pivot pins which engage the non-snap-in slotted side of fastening brackets 43 in a similar manner.

Figure 7:
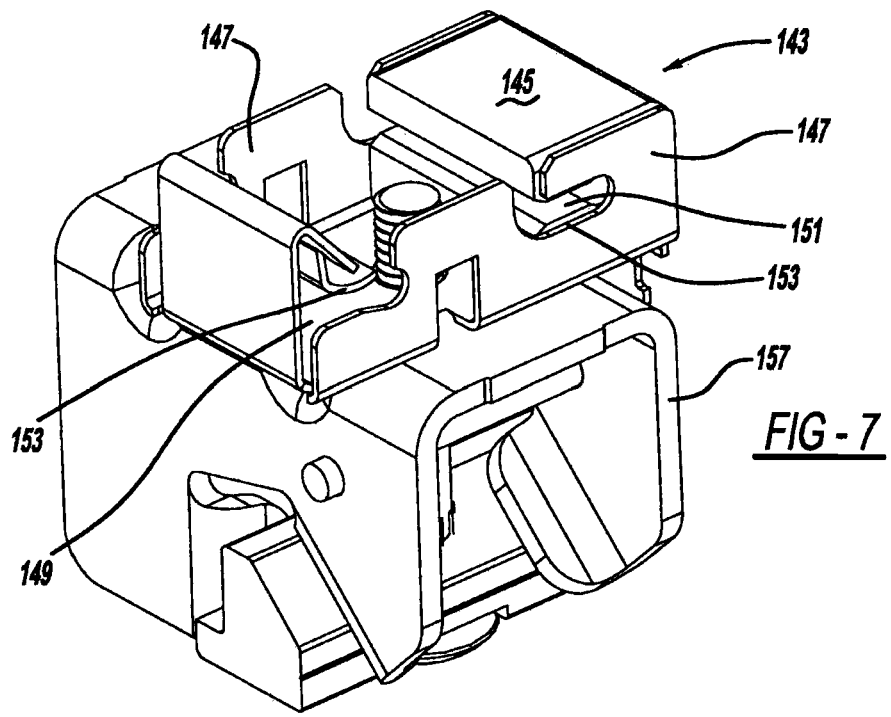
FIG. 7 is a top perspective view showing the fastening bracket and roof clamp of an alternate embodiment system.

Finally, an alternate embodiment catch or fastening bracket 143 is shown in FIG. 7. This fastening bracket 143 is like that of the prior embodiment, except that an elastomeric and resilient polymeric block 145 is located between side walls 147 and above a base wall 149. Block 145 has a lateral groove 151 aligned with the adjacent pair of hook slots 153 farthest away from a locking tab 155. Block 145 compensates for hinge bracket-to-fastening bracket movement, thermal expansion of a roof clamp 157 and fastening bracket 143 relative to the solar panel, and to dampen vibrations. Moreover, this fastening bracket 143 is secured to roof clamp 157 and the roof in the same manner as the prior embodiment.

While various aspects of the present fastening system have been disclosed, it should be appreciated that modifications can be made. For example, the present accessory mounting brackets or catches can be secured to conventional roof clamps such as those disclosed in the following U.S. Pat. Nos.: 7,758,011 entitled "Adjustable Mounting Assembly for Standing Seam Panels" which issued to Haddock on Jul. 20, 2010; U.S. Pat. No. 7,386,922 entitled "Snow-Guard Clamping Unit" which issued to Taylor et al. on Jun. 17, 2008; and U.S. Pat. No. 5,715,640 entitled "Mounting Device for Controlling Uplift of a Metal Roof" which issued to Haddock on Feb. 10, 1998; except many of the present advantages will not be realized. These patents are incorporated by reference herein. Moreover, more or less hooks and additional locking tabs can be attached to a single bracket although some of the present advantages may not be obtained. Furthermore, the brackets can be injection molded from a polymer, cast from aluminum, or otherwise differently manufactured, however, various advantages may not be achieved. The roof rail can also have a different shape and be alternately secured to the roof although certain advantages may not be observed. A peripheral frame on the solar panel can be attached to the snap-in tab and/or hooks instead of the pivot pin, however, various advantages may not be achieved. The fastening bracket can be alternately mounted directly to the rail or building although some advantages may be missed. Individual elements or features of a particular embodiment are generally not limited to that particular embodiment, but, where applicable, are interchangeable and can be used in a selected embodiment, even if not specifically shown or described. Such variations are not to be regarded as a departure from the disclosure, and all such modifications are intended to be included within the scope of the present invention.

The invention claimed is:

1. A solar panel securing system comprising:
a member pre-attached to a solar panel;
a building roof-mounted fastening bracket including a resilient locking tab; the
member contacting against and deflecting a segment of the locking tab in a snap-in motion so that at least a portion of the solar panel is secured to the fastening bracket; and
the fastening bracket further comprising at least one hook defined by an undercut, openly accessible slot, and the member being trapped in the slot by the locking tab.

2. The system of claim 1, further comprising a roof clamp attached to the fastening bracket.

3. The system of claim 2, wherein the fastening bracket is pre-attached to the roof clamp and the roof clamp is positioned on top of a building roof prior to securing the member to the fastening bracket.

4. The system of claim 2, further comprising an elongated rail having a base and an upstanding flange, the roof clamp being secured onto the flange by use of a cammed wedge, and weight of a ballast holding the otherwise moveable base of the rail against a building roof.

5. The system of claim 1, wherein the fastening bracket includes four of the hooks, with their leading tips all generally facing toward the locking tab.

6. The system of claim 1, wherein the fastening bracket further comprises side walls upstanding from a base wall which is substantially flat, the fastening bracket having a substantially U-end view shape, and the locking tab including a first segment upstanding from an edge of the base wall generally between the side walls and a diagonal segment downwardly and inwardly angled from the first segment.

7. The system of claim 1, wherein the member is a laterally elongated and cylindrical pin extending between downwardly extending structures of a hinge bracket mounted to the solar panel which is frameless, and further comprising a second pin extending from a second solar panel being coupled to a hook of the fastening bracket.

8. A solar panel securing system comprising:
a solar panel;
a member pre-attached to the solar panel;
a building roof-mounted fastening bracket including a resilient locking tab;
the member contacting against and deflecting a segment of the locking tab in a snap-in motion so that at least a portion of the solar panel is secured to the fastening bracket; and
a hinging bracket, including the member, being directly adhered to a bottom glass surface of the solar panel.

9. The system of claim 8, wherein the fastening bracket further comprises at least one hook defined by an undercut, openly accessible slot, and the member is trapped in the slot by the locking tab.

10. The system of claim 8, wherein:
the fastening bracket includes four of the hooks, with their leading tips all generally facing toward the locking tab;
the fastening bracket further comprises side walls upstanding from a base wall which is substantially flat, the fastening bracket having a substantially U-end view shape, and the locking tab including a first segment upstanding from an edge of the base wall generally between the side walls and a diagonal segment downwardly and inwardly angled from the first segment; and
the base wall of the bracket further includes a central aperture adapted to receive a threaded shaft therethrough.

11. A solar panel securing system comprising:
a member pre-attached to a solar panel;
a building roof-mounted fastening bracket including a resilient locking tab;
the member contacting against and deflecting a segment of the locking tab in a snap-in motion so that at least a portion of the solar panel is secured to the fastening bracket; and
a resilient block mounted between side walls of the fastening bracket and having a groove aligned with a pair of hook slots in the side walls.

12. A solar panel securing system comprising a fastening bracket which further comprises:
a base wall and at least two upstanding hooks each defined by an undercut slot; and
a flexible locking tab including an upstanding segment projecting from the base wall, and a downwardly and inwardly angled diagonal segment generally oriented toward open ends of the at least two hooks, the diagonal segment being laterally located substantially between the slots of the at least two hooks;
the base wall, the at least two hooks and the locking tab all being a single piece of metal.

13. The system of claim 12, wherein the fastening bracket includes four of the hooks, all having their open hook tips facing in the same direction toward the locking tab.

14. The system of claim 12, wherein the locking tab of the fastening bracket further comprises an undulating and centrally extending tongue segment, and at least one shorter locking finger segment.

15. The system of claim 12, wherein the fastening bracket further comprises side walls upstanding from the base wall which is substantially flat, the hook being part of one of the side walls and the fastening bracket having a substantially U-end view shape.

16. The system of claim 12, further comprising a solar panel including a glass bottom surface, and a localized hinge bracket including an unthreaded pin, the hinge bracket being directly adhered to the glass bottom surface, and the pin being removeably received in the slot of the hook and being locked thereto by the locking tab.

17. The system of claim 12, further comprising a roof clamp having a cammed wedge and an elongated roof rail, the roof rail including an upstanding flange, and the roof clamp engaging opposite sides of the flange without use of a screw contacting the flange.

18. A solar panel securing system comprising:
a first, frameless solar panel assembly including a glass surface;
a second, frameless solar panel assembly including a glass surface;
a first attachment bracket including a pair of downwardly oriented and spaced apart plates with a pin spanning therebetween, an upper section of the first attachment bracket being coupled to the first solar panel in a pre-assembled manner;
a second attachment bracket including a pair of downwardly oriented and spaced apart plates with a pin spanning therebetween, an upper section of the second attachment bracket being coupled to the second solar panel in a pre-assembled manner; and
a fastening bracket comprising a base wall, hooks and a snap-in locking structure;
at least one of the hooks of the fastening bracket engaging the pin of the first attachment bracket and allowing the solar panel to be subsequently pivoted when installed; and
the snap-in locking structure of the fastening bracket securing the pin of the second attachment bracket when installed.

19. The system of claim 18, wherein the attachment brackets are adhesively bonded directly to the glass surfaces of the respective solar panels, and the pins are elongated substantially parallel to the bottom glass surfaces.

20. The system of claim 19, further comprising a roof clamp having a cammed wedge and an elongated roof rail, the roof rail including an upstanding flange, and the roof clamp engaging opposite sides of the flange without use of a screw contacting the flange, the fastening bracket being assembled to the roof clamp and the roof clamp to the roof rail prior to the fastening bracket securing the pins and solar panels.

21. A method of installing a solar panel to a building roof, the method comprising:
(a) engaging a first structural member coupled adjacent one side of the solar panel with a receptacle of a first roof-mounted fastener;
(b) pivoting the solar panel about the first member-to-receptacle interface;
(c) inserting a second structural member coupled adjacent an opposite side of the solar panel into a lock of a second roof-mounted fastener spaced from the first fastener; and
(d) deflecting a segment of the lock to snap-in the second structural member;
wherein the receptacle is an undercut defined by an upstanding hook and the first structural member is an unthreaded pin laterally elongated substantially parallel to a bottom surface of the solar panel.

22. The method of claim 21, further comprising positioning the first and second fasteners on top of a substantially flat building roof.

23. The method of claim 21, further comprising attaching the first member to a first elongated rail and attaching the second member to a second elongated rail, and positioning the rails on a building without piercing the building.

24. The method of claim 21, further comprising adhesively bonding a bracket affixed to the first structural member directly to a bottom glass surface of the solar panel, in a pre-assembled and off-site manner.

* * * * *

UNITED STATES PATENT AND TRADEMARK OFFICE
CERTIFICATE OF CORRECTION

| | | |
|---|---|---|
| PATENT NO. | : 8,713,881 B2 | Page 1 of 1 |
| APPLICATION NO. | : 13/359944 | |
| DATED | : May 6, 2014 | |
| INVENTOR(S) | : DuPont et al. | |

It is certified that error appears in the above-identified patent and that said Letters Patent is hereby corrected as shown below:

In the Specification
Column 3 - Detailed Description; Line 48; delete "45." and insert --115.--, therefor In the Claims
Column 4, Claim 1; Line 37; In Claim 1, after "tab;", delete "the", therefor
Column 4, Claim 1; Line 38; In Claim 1, before "member", insert --the--, therefor Signed and Sealed this
Ninth Day of September, 2014

Michelle K. Lee
*Deputy Director of the United States Patent and Trademark Office*